Jan. 21, 1936.   F. C. McCLANAHAN   2,028,515
MECHANISM FOR LOCKING GAS TANK COVERS
Filed Feb. 27, 1935
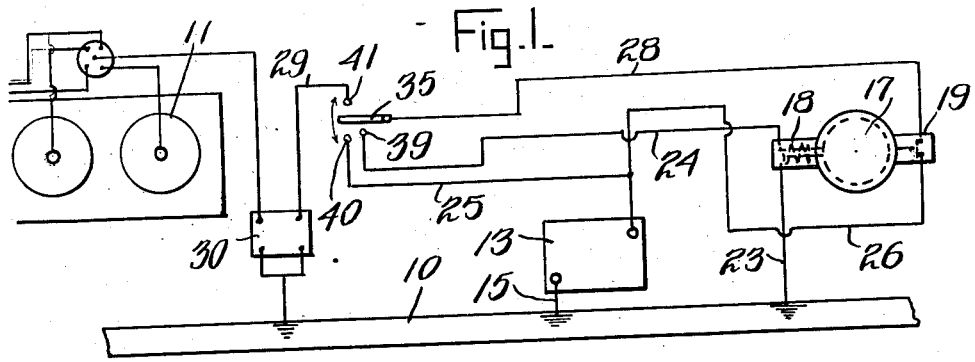
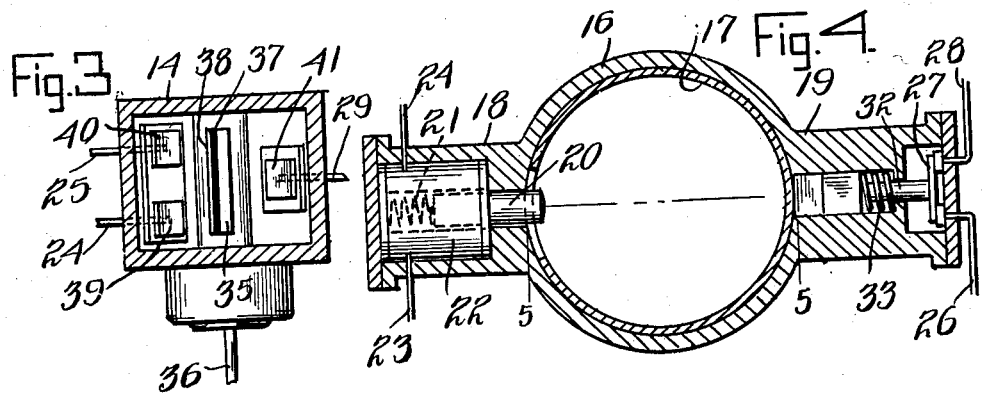
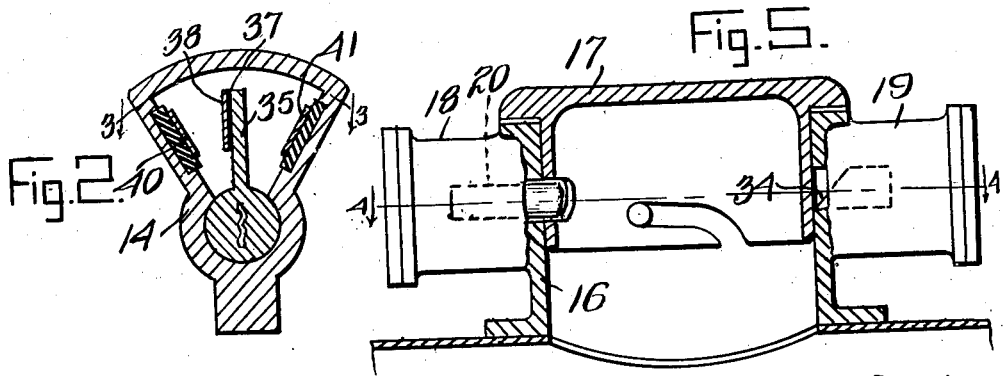
Inventor
Frederick C. McClanahan
By J. F. Gulick
Attorney Patented Jan. 21, 1936

2,028,515

UNITED STATES PATENT OFFICE 2,028,515

MECHANISM FOR LOCKING GAS TANK COVERS

Frederick C. McClanahan, Homer, La.

Application February 27, 1935, Serial No. 8,578

6 Claims. (Cl. 123—146.5)

This invention relates to mechanism for locking the caps on gas tanks of motor vehicles. Its object is to provide means operated in conjunction with the ignition switch of the vehicle for releasing locking means on the tank. A further object is to provide means for preventing operation of the vehicle when the gasoline tank cap is removed. A still further object is to provide means for insuring that the engine is stopped before opening of the gasoline tank.

A further general object is to provide simple mechanism for carrying out the above named objects.

Further objects and advantages will become apparent from the description which follows.

Referring to the accompanying drawing which is made a part hereof, and on which similar reference characters indicate the same parts throughout, Figure 1 is a diagrammatic view showing the wire circuits in their relation to the several parts of the vehicle, Figure 2 is a vertical section thru the ignition switch, Figure 3 is a section of the ignition switch taken on line 3—3, Figure 4 is a horizontal section of the gas tank cover, taken on line 4—4 of Figure 5, and Figure 5 is a section on line 5—5 of Figure 4.

The objects of the invention are carried out by the provision of a positive lock for the gas tank cover which is released by electrically operated means which are controlled by the ignition key. The ignition key must be rotated to a predetermined position before the electrically operated means are put in operation. The mechanism is so arranged, moreover, that the ignition circuits are broken so that the engine is stopped before the means for releasing the locking means are operated.

In order to prevent operation of the vehicle when the cover of the tank is off means are provided for breaking a circuit to the ignition switch upon removal of the cap. This circuit is closed only when the cap or cover is in position on the gas tank.

In the drawing numeral 10 indicates a portion of the vehicle frame. Numerals 11 and 12 indicate the engine and the ignition circuit to the engine respectively. A battery 13 is grounded to the vehicle frame thru wire 15. The ignition switch as a whole is indicated at 14 and is shown in detail in Figures 2 and 3. The gasoline tank is provided with a neck portion 16, upon which any suitable cover 17 is fitted and secured. The cap may be secured by a conventional bayonette slot fastening as shown in Figure 5.

The neck portion 16 is provided with suitable housings 18 and 19 which may be made integral therewith or which may be secured thereon in any suitable way. The housing 18 carries the locking plunger 20. This plunger extends thru the wall of the neck 16 and into a suitable hole or slot in the depending portion of the cover which fits within the neck. A spring 21 at the rear of the plunger urges it into locking position. It is retracted by a solenoid 22. This solenoid is grounded to the vehicle frame by wire 23, and is connected with battery 13 by wires 24 and 25, which wires are connected to contacts 39 and 40 in the ignition switch. The solenoid is energized only when circuit is closed across contacts 39 and 40 as will be later described.

The movable element of the ignition switch is the arm 35 which is operated by the usual ignition key 36. The ignition circuit consists of wire 26, switch 27, wire 28, arm 35, wire 29 which closes circuit from the battery to the coil 30. The circuit is closed only when switch 27 is closed and when arm 35 is moved to contact point 41. The switch arm 35 is made of electrically conductive metal or carries a conductive plate so as to make a circuit from wire 28 to wire 29.

The switch element 27 is carried on the outer end of a plunger 32. A spring 33 is compressed between the enlarged end of the plunger and the inner end of the socket in which the plunger is housed and tends to urge the plunger inwardly to move the switch element 27 inwardly to open circuit thru lines 26, 28, etc. The inner end of the plunger is beveled at 34 and is engageable by the depending portion of the cover 17 so that when the cover is put on the plunger will be retracted and the switch 27 closed. When the cover is off, the switch will be open.

The switch arm 35 carries a conductive plate 38 which is insulated from the arm by suitable material 37. When the switch arm 35 is rotated counter clockwise, Figure 2, to the limit of its movement the plate 38 closes circuit across contact points 39 and 40 to energize the solenoid 22, withdraw the locking plunger 20 and release the cap locking means.

From the foregoing description it will be apparent that the cover for the gas tank can be removed only when the ignition switch has been moved to a predetermined position. Fire regulations in many places require that the engine must be stopped while filling the gasoline tank.

This invention insures stopping of the engine before the cover can be removed from the tank. It insures locking of the cover until it is released by the ignition key, and it prevents the operator of the vehicle starting the car until the cover is put on the tank. Should the cover be dropped off in motion, the ignition circuit will be immediately broken, so that the operator can recover the cap at once since he will know just where he has lost the cap.

It will be obvious to those skilled in the art that various changes may be made in the invention without departing from the basic principle thereof, I, therefore, do not limit myself to the invention as shown specifically in the drawing and described in the specification, but only as set forth in the appended claims.

What I claim is:

1. The combination with a gas tank cover of a lock for said cover, electrically operated means for releasing said lock, means operated by the ignition key of the vehicle for controlling said electrically operated means, said means permitting releasing of said lock only after the ignition circuit to the engine has been broken.

2. The combination with a gas tank cover of locking means for said cover comprising a plunger with means for positively moving said plunger to locking position, electrically operated means for retracting said plunger to release the locking means, an ignition switch, an arm in said switch, a circuit to said electrically operated means and a pair of contacts in said ignition switch adapted to be closed by said arm to energize said electrically operated means.

3. In a motor vehicle having a gas tank with removable cover, means for locking said cover on the tank, means for preventing removal of the cover when the engine is running, and means for preventing running of the engine when the cover is removed.

4. In a motor vehicle having a gas tank with removable cover, means for locking said cover on the tank, electrically operable means for releasing the locking means, means for preventing operation of said electrically operable means without stopping the engine and means for preventing starting of the engine until the cover is placed in position on the tank.

5. In a motor vehicle having a gas tank with removable cover, means for locking said cover on the tank, a solenoid for retracting said locking means, an ignition coil, an ignition switch having an arm movable to a position to close circuit to said coil and to a position to energize the said solenoid, said arm breaking circuit to the coil when the solenoid is energized.

6. In a motor vehicle having a fuel tank with removable cover thereon, an ignition circuit, a switch in said circuit, means engageable by said cover for holding said switch closed when said cover is in place but operable to open said switch when said cover is removed from the tank, means for locking said cover on said tank, electrically operable means for releasing said locking means said electrically operable means being operable only when said ignition circuit is broken.

FREDERICK C. McCLANAHAN.